United States Patent [19]
Adachi et al.

[11] 3,991,157
[45] Nov. 9, 1976

[54] PROCESS FOR PRODUCING TITANIUM TETRACHLORIDE

[75] Inventors: Masaaki Adachi, Otsu; Kenichi Ichimura; Takayoshi Shirai, both of Kusatsu, all of Japan

[73] Assignee: Ishihara Sangyo Kaisha Ltd., Japan

[22] Filed: Mar. 20, 1975

[21] Appl. No.: 560,172

[30] Foreign Application Priority Data
Mar. 23, 1974 Japan.................................. 49-32892

[52] U.S. Cl.................................... 423/79; 423/74; 423/492
[51] Int. Cl.²......................................... C01G 23/02
[58] Field of Search............. 423/79, 74, 659 F, 492

[56] References Cited
UNITED STATES PATENTS

| | | | |
|---|---|---|---|
| 2,320,273 | 5/1943 | Gohr et al. | 423/659 F UX |
| 2,488,029 | 11/1949 | Scheineman | 423/659 F X |
| 2,683,685 | 7/1954 | Matheson | 423/659 UX |
| 2,786,280 | 3/1957 | Gishler et al. | 423/659 F UX |
| 2,940,826 | 6/1960 | Andersen | 423/74 |
| 3,488,143 | 1/1970 | Wendell et al. | 423/79 |
| 3,495,936 | 2/1970 | Jones | 423/79 |

FOREIGN PATENTS OR APPLICATIONS

163,317   6/1955   Australia............................. 423/659

*Primary Examiner*—Edward Stern
*Attorney, Agent, or Firm*—Cushman, Darby & Cushman

[57] ABSTRACT

A chlorine-containing gas is introduced as an upward flow into a vertical, upwardly widening column-type reactor, and a titaniferous material and a solid carbonaceous reducing agent are charged into the reactor at its upper and lower parts to effect chlorination in a dilute-phase fluidization system accompanied by reflux of part of the solid materials and thereby yield titanium tetrachloride.

9 Claims, 3 Drawing Figures

PROCESS FOR PRODUCING TITANIUM TETRACHLORIDE

The present invention relates to a process for producing titanium tetrachloride. More particularly, the invention pertains to an improved process for producing titanium tetrachloride by the chlorination of titaniferous materials in a dilute-phase fluidization system.

Most production of titanium tetrachloride has been heretofore carried out by a fluidized bed chlorination. In this process, a titaniferous ore and a solid carbonaceous reducing agent, which are charged into a fluidized bed chlorinator, form an ordinary fluidized bed by a chlorine-containing gas introduced into the chlorinator through a distributor at the bottom of the reactor. In this case it is required that the titaniferous ore and the solid carbonaceous reducing agent have a particle size suitable for fluidization which is not excessively find. Also, it is unavoidable that part of the unreacted solid materials is carried over from the reactor and lost. Further, there is the possibility that chlorides having high boiling points such as magnesium chloride and calcium chloride, which are formed by the reaction and hardly vaporize, accumulate on the bed to cause the plugging of the distributor and the bed sintering and prevent the formation of a uniform fluidized bed. Therefore, the content of the impurities which form such chlorides having high boiling points in the titaniferous raw material should be as low as possible.

On the one hand, U.S. Patent No. 3,495,936 discloses a process which comprises using a dilute-phase fluidized bed reactor, introducing solid raw materials and a chlorinating gas into the reactor at its lower part, and effecting chlorination in a dilute-phase fluidized bed. This process has advantages in that comparatively fine particulate solid raw materials can be used and it is possible to reuse the carried over particles and to use a material having a high content of impurities as no gas distributor is used. However, the process has disadvantages in that (1) materials rich in fine particles of, for example, −200 mesh are difficult to use; (2) the charge density of the solid phase in the reaction zone is low as compared with the above-mentioned ordinary fluidization chlorination and it is difficult to convert both the gas and solid phases simultaneously at a high yield owing to parallel flow; and (3) the heat of reaction is carried away from the system together with the formed gas flow rendering the heat balance unfavorable.

It is, therefore, the principal object of the present invention to avoid the difficulties heretofore encountered in the chlorination of titaniferous ores to form titanium tetrachloride.

It is a further object to provide an improved process for producing titanium tetrachloride by effecting chlorination in a dilute-phase fluidization system in a commercially feasible manner.

Another object of the present invention is to provide a process for producing titanium tetrachloride in which titaniferous materials having such a fine particle size as is not suitable for ordinary fluidization chlorination or having a high impurity content can also be used and a high reaction efficiency and a good heat balance can be obtained, and an apparatus suitable therefor.

Other objects and a fuller understanding of the invention may be apparent from the following description and claims, taken in conjunction with the accompanying drawings in which:

Figure 1:
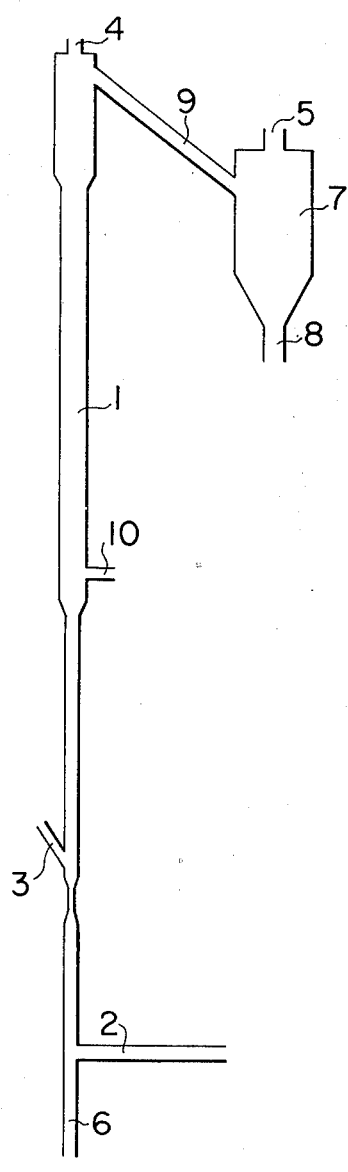
FIG. 1 is a drawing outlining a multi-stage column-type reactor for small-scale experiments.

According to the present invention, there is provided an improved process for producing titanium tetrachloride which comprises chlorinating a titaniferous material with a chlorine-containing gas in the presence of a solid carbonaceous reducing agent, characterized in that (1) the sectional area of the upper part of the reaction zone is 1.2 to 10 times as large as that of the lower part of the reaction zone, (2) said titaniferious material is in the form of fine particles at least 20% by weight of which passes through a 200 mesh Tyler standard sieve, (3) solid raw materials consisting of said titaniferous material and said solid carbonaceous reducing agent are introduced into the reactor through feed-pipes provided at least two places including each one place at the upper and lower parts of the reactor, and (4) said chlorine-containing gas is introduced as an upward flow, so that the reaction zone may be maintained in a dilute-phase fluidization system accompanied by the reflux of part of the solid raw material particles.

The solid raw materials used in the process of the present invention are a titaniferous material and a carbonaceous reducing agent. The titaniferous materials include titaniferous ores such as rutile and ilmenite, and titanium concentrates such as titanium slag, and synthetic rutile, and their $TiO_2$ content is at least 50% by weight, and preferably at least 60% by weight, and more preferably at least 80% by weight. Also, the solid carbonaceous reducing agents include charcoal and coke.

At least 20% by weight, and preferably at least 30% by weight of the titaniferous material used should pass through a 200 mesh Tyler standard sieve. Usually, a suitable particle size can be obtained by adjusting the particle size so that at least about 50 to 60% by weight may pass through a 150 mesh standard sieve. It is unnecessary in the process of the present invention to take into consideration carry-over loss so much. Therefore, the use of finer particles is rather desirable in that the reaction interface is increased and the reaction efficiency is enhanced. The particle size of the solid carbonaceous reducing agent may be slightly larger than that of the above-mentioned titaniferous material. Thus, at least about 50 to 60% by weight of the solid carbonaceous reducing agent usually passes through a 80 mesh standard sieve. As the chlorinating gas, chlorine is usually used, but oxygen, air or an inert gas may be added thereto if necessary.

In the process of the present invention, heat exchange occurs between the high temperature reacted gas and the solid raw materials refluxed. Therefore, the raw materials may be charged into the reactor without preheating them. However, of course, the solid raw materials or the chlorine-containing gas fed at the lower part of the reactor can be preheated to a temperature of about 300° to 800° C which is near to the reaction temperature. When the chlorine-containing gas is preheated if necessary, the preheating is conducted by either external heating or internal heating.

If the exhaust gas contains excess unreacted chlorine, the separation and recovery of chlorine becomes necessary and the use of a corrosion-resistant apparatus and heat loss are brought about. In order to avoid these troubles, it is desirable to feed the titaniferous material in an amount in excess of the theoretical amount required for chlorination. Also, it is preferable to use the solid carbonaceous reducing agent in an amount in excess of the amount required for the reaction and about 10 to 40% by weight of the reducing agent is usually contained in the makeup solid raw materials.

The reactor used in the process of the present invention is generally called by "a dilute-phase reactor" and is of such a type as the reaction is conducted while solid particles are subjected to gas transportation as a dilute-phase fluidization. Particularly, the reactor is substantially vertical and upwardly widening and is in the form of a column, tower or tube, the sectional area of the upper part of the reaction zone being 1.2 to 10 times, and preferably 1.4 to 6 times, as large as that of the lower part of the reaction zone. Usually, the height of the reactor is ten times to hundreds of times as large as the diameter of the reactor. As a whole, the reactor has a circular or polygonal section and is of an upwardly non-stepwise widening pen-holder-form column type or of a multi-stage column type having an upwardly stepwise widening multi-stage rocket-form.

The feed-pipe for the solid raw materials is provided at at least two places including each one place at the upper and lower parts of the reactor. The lower feed-pipes consist of a feed-pipe near the lower end of the reaction zone and at least one feed-pipe as provided if necessary. The lower end feed-pipe is positioned at a point close to the lower end feed-pipe for the gas, but the solid raw material particles may be introduced through the feed-pipe for the gas by suspending them in the gas as the case may be. Further, at least one feed-pipe can be provided at at least one suitable place in the reaction zone, and usually at the middle or lower parts of the reaction zone. Although the reaction system tends to become uniform by the reflux of part of the solid raw materials in the process of the present invention, the reaction becomes ununiform owing to the length of the reactor as the case may be. In such a case, it is advisable to control the temperature of the reaction zone so that the temperature balance of the whole reaction zone may be maintained by providing another feed-pipe above the lower end feed-pipe as described above where additional chlorination or the combustion of carbon occurs. The upper feed-pipe is usually provided near the head of the reactor which is a heat exchange zone or near the upper end of the reaction zone. The feed-pipe for the chlorine-containing gas is provided at at least one place at or near the lower end of the reaction zone. The gas is usually fed upwardly through a nozzle. If plurality of the lower feed-pipes for the solid raw materials are provided as described above, it is preferable to introduce the chlorinating gas correspondingly through the corresponding plural feed-pipes.

The solid raw materials and the chlorine-containing gas as introduced at the lower part of the reactor form a dilute-phase fluidized bed and ascends as an upward flow while they are reacted. Since the gas flow increases in volume by a change of volume due to the reaction or by the addition of the gas on the way, the linear velocity of the gas flow increases as the gas flow proceeds upwardly if the sectional area of the reactor is constant over the whole length of the reactor. Since the sectional area of the reactor used in the process of the present invention widens as it rises to a higher position, however, the linear velocity of the gas decreases as the gas flow proceeds upwardly or is kept almost constant.

Further, the amount of solid particles present at the upper part of the reactor exceeds the saturation carrying capacity of the gas owing to the introduction of the solid raw materials through the upper feed-pipe. The particles supplied from the upper part of the reactor or the coarse particles in the upward flow descend against the upward flow of the gas by gravitation or channelling. Thus, so-called reflux occurs. The thus descended particles again ascend together with the gas flow or are consumed by the reaction and their size decreases. The fine particles then ascend and are carried over.

Thus, the reaction zone in the process of the present invention is not a mere dilute-phase fluidized bed, but is accompanied by the reflux of part of solid particles. Therefore, the solid charge in the reactor is large as compared with a usual dilute-phase fludized bed. Generally, a charge density of 10 to 200 kg/m$^3$, and preferably 20 to 150 kg/m$^3$ and more preferably 25 to 100 kg/m$^3$, is maintained. A suitable linear velocity of the gas depends upon the size and shape of the reactor and the solid particle size. In general, the maximum superficial velocity in column may be 1 to 10 m/sec, and preferably 1.2 to 6.0 m/sec. The reaction temperature may usually be 900 to 1400° C, and preferably 1000° to 1300° C.

A ratio of the amount of the solid raw materials fed through the upper feed-pipe to the amount of the solid raw materials fed through the lower feed-pipe depends upon the kinds of the raw materials used and the structure, shape or scale of the reactor used. However, it is generally desirable that the amount fed through one feed-pipe is not less than 10% by weight of the amount fed through another feed-pipe.

As is clear from the above description, it is conceived as an embodiment of the process of the present invention to feed all or most of the makeup solid raw materials through the upper feed-pipe and feed through the lower feed-pipe the comparatively fine particles carried over. Likewise, it is another preferable embodiment to screen the whole solid raw materials and introduce their large size part and small size part through the upper feed-pipe and the lower feed-pipe, respectively. Even if there is a difference in the ratio of the titaniferous material to the carbonaceous reducing agent in the solid raw materials between the upper feed and the lower feed in such a case, it does not interfere with the reaction. However, it should be avoided that the feed through the lower feed-pipe consists substantially only of the carbonaceous reducing agent.

The temperature of the exhaust gas is 900° to 1400° C. As the exhaust gas contains chlorides such as titanium tetrachloride and iron chloride and gaseous components such as oxygen, chlorine, carbon dioxide and carbon monoxide and further the unreacted solid raw materials such as the titaniferous material and the carbonaceous reducing agent, the exhaust gas is separated into the gaseous components and the solid components by a gas-solid separator. The gaseous components are passed to a titanium tetrachloride condensation system to recover titanium tetrachloride. The separated solid components, while hot, are recycled to the reactor for re-use as they are or in admixture with the makeup raw materials.

Thus, in the process of the present invention, the particles fed through the upper feed-pipe are countercurrently contacted with the hot temperature gas leaving the reaction zone to effect heat exchange. Further, even in the reaction zone, the refluxed particles contribute to the good distribution of the heat of reaction. As a result, the heat balance as a whole can be improved. Also, the contact effect among the titaniferous material, the carbonaceous reducing agent and the chlorine-containing gas is enhanced and the reaction efficiency is improved by increasing the solid charge density in the reaction zone and baffling action, both of which action being produced by reflux.

Figure 2:
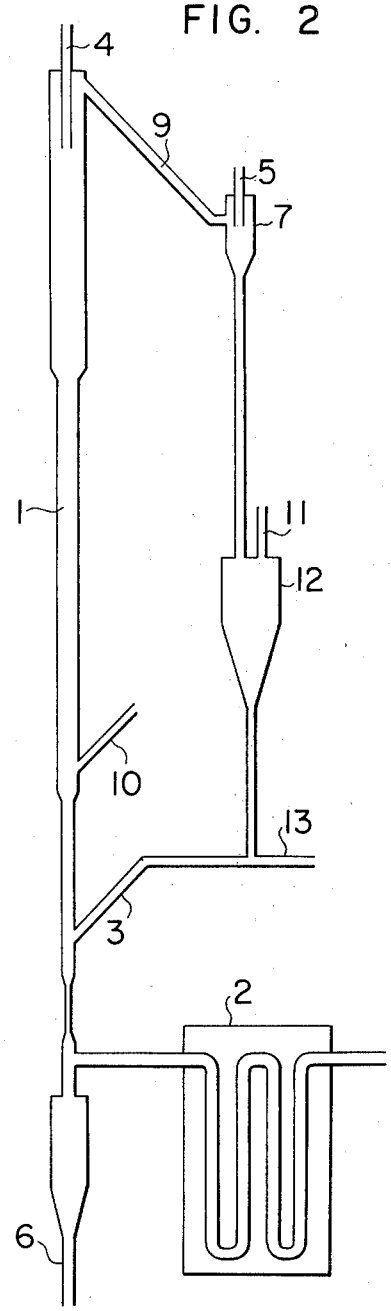
FIG. 2 is a drawing outlining a multi-stage widening column-type reactor in which carried over particles are recycled for re-use.
Figure 3:
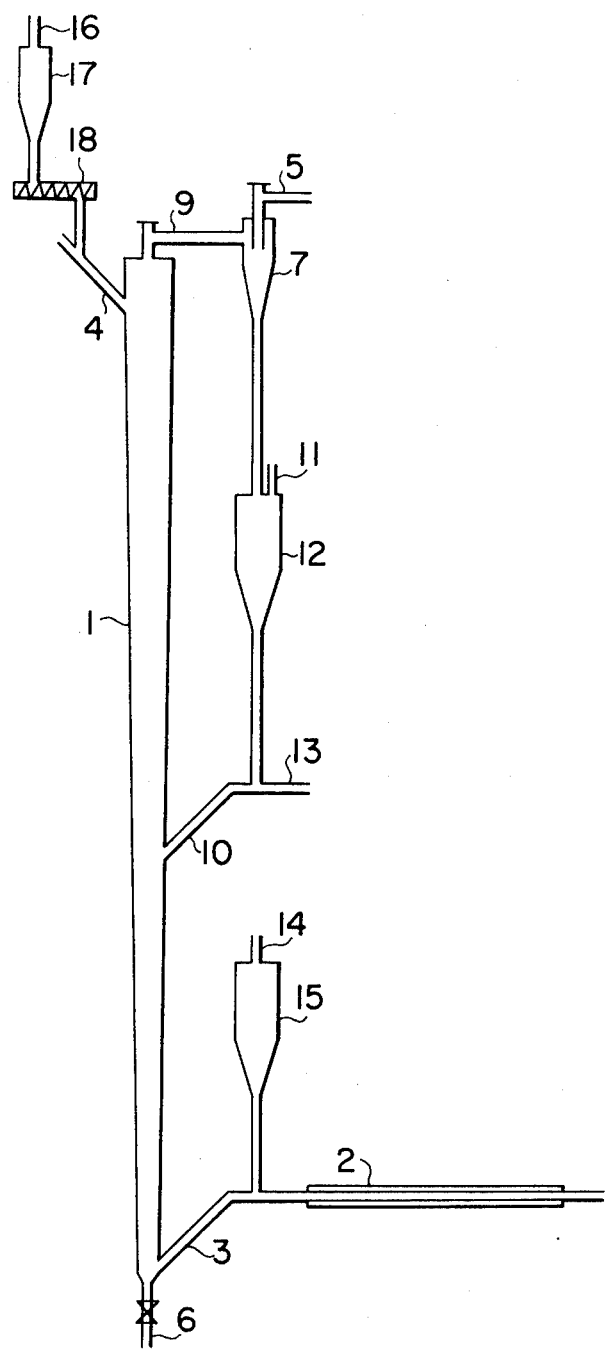
FIG. 3 is a drawing outlining a continuously widening column-type reactor similar to the reactor as shown in FIG. 2.

A few examples of the apparatus used in the process of the present invention are illustrated in the accompanying drawings. In FIGS. 1 to 3, reference characters 1 to 18 indicate as follows:

1 Reactor
2 Gas preheater
3 Lower feed-pipe for solid raw materials or for solid raw materials and gas
4 Upper feed-pipe for solid raw materials
5 Exit for produced chloride gas
6 Exit for hold-up particles in the reactor
7 Cyclone
8 Exit for collected particles
9 Conduit for chloride gas connecting 1 and 7
10 Feed-pipe for solid raw materials or for solid raw materials and gas
11 Inlet for raw materials
12 Bin for collected particles and raw materials fed through lower feed-pipe
13 Inlet for part of chlorine-containing gas or inert carrier gas
14, 15 Inlet and bin for solid raw materials
16, 17, 18 Inlet, bin and feeder for solid raw materials In order that those skilled in the art may better understand how the present invention can be practiced, the following examples are given by way of illustration and not by way of limitation. In the examples all percents are expressed by weight and all mesh values are expressed based on Tyler standard unless otherwise indicated.

EXAMPLE 1

A quartz three-stage column type reactor having the following dimensions as shown in FIG. 1 was used:

| | | |
|---|---|---|
| First column: | | |
| Diameter | 10 | mm |
| Length | 80 | cm |
| Second column: | | |
| Diameter | 14 | mm |
| Length | 120 | cm |
| Third column: | | |
| Diameter | 23 | mm |
| Length | 20 | cm |

320 Grams of synthetic rutile (a titanium concentrate obtained by beneficiating ilmenite by acid leaching, $TiO_2$ content 96%, total Fe content 0.8%, 150 mesh pass 95%, and 200 mesh pass 60%) and 130 g of coke (80 mesh pass 100%) were premixed. 50 Grams of the mixture and 400 g of the mixture were charged into the reactor tube preheated to 1200° C through its lower feed-pipe 3 and its upper feed-pipe 4, respectively. The reactor was additionally electrically heated to prevent the heat loss of the reactor.

A gaseous mixture consisting of 90% by volume of chlorine and 10% by volume of oxygen was introduced at a superficial velocity in column of 1.4 m/sec near the feed-pipe 3, and reacted with said solid raw material mixture supplied continuously for 105 minutes. The reaction occurred substantially in the first and second stages of the column and the average solid charge density in the column was 83 kg/m³. Thus, 481 g of crude titanium tetrachloride was obtained as the reaction product. When the chloride contained in the reaction product gas was condensed and separated and the unreacted chlorine in the waste gas was then absorbed in an alkaline aqueous solution, the conversion of chlorine was found to be 98%. The operation of the process of the present invention was stable. It was merely required to ensure the above-mentioned manner of feeding said solid raw materials. A variation of the pressure drop in the reactor tube was little and sintering of the charged particles did not occur.

EXAMPLE 2

The same reactor as in Example 1 was used. 560 Grams of Sri Lanka rutile ore ($TiO_2$ content 96%, total Fe content 0.2%, 150 mesh pass 75%, and 200 mesh pass 45%) and 140 g of coke (80 mesh pass 100%) were previously mixed. 450 Grams of the mixture and 210 g of the mixture were fed through the lower feed-pipe 3 and the upper feed-pipe 4, respectively. The reaction was carried out in the same manner as in Example 1 except that the superficial velocity of the gas in the column near the feed-pipe 3 was 2.0 m/sec and said mixture was continuously charged for 140 minutes. The average solid charge density in the column was 53 kg/m³. Thus, 802 g of crude titanium tetrachloride was obtained as the reaction product. In the same manner as in Example 1, the conversion of chlorine was found to be 86%.

EXAMPLE 3

A quartz three-stage column type reactor having the following dimensions as shown in FIG. 2 was used:

| | | |
|---|---|---|
| First column: | | |
| Diameter | 50 | mm |
| Length | 50 | cm |
| Second column: | | |
| Diameter | 70 | mm |
| Length | 150 | cm |
| Third column: | | |
| Diameter | 100 | mm |
| Length | 100 | cm |

20 Kilograms of Sri Lanka rutile ore ($TiO_2$ content 96%, total Fe content 0.2%, 150 mesh pass 75%, and 200 mesh pass 45%) and 5 kg of coke (48 mesh pass 70%) were first premixed. The mixture was continuously charged into the reactor preheated to 1200° C through the feed-pipe 4 for 205 minutes. Meanwhile, the collected carried over particles were further fed through the feed-pipe 3. A ratio of the rutile ore to coke in the collected particles was about 76:24 and the amount of the recycled particles in the operation was about 7 kg. A gaseous mixture consisting of 80% by volume of chlorine and 20% by volume of oxygen was fed through the feed-pipes 2 and 3 at a ratio of 4:1, and the superficial velocity of the gas flow in the column was 3.0 m/sec near the feed-pipe 3. The reaction was conducted substantially up to about the middle of the third stage of the column, and the average solid charge density in the reactor was 35 kg/m³. Thus, 44 kg of crude titanium tetrachloride was obtained as the reaction product. In the same manner as in Example 1, the conversion of chlorine was found to be 98%.

EXAMPLE 4

The same reactor as in Example 3 was used. 5.5 Kilograms of pulverized high titanium slag (TiO₂ content 94% and total Fe content 1.4%) was screened through a 200 mesh sieve to obtain 4 kg of larger particle part not passing the sieve. On the one hand, 1.5 kg of coke was screened through a 60 mesh sieve to obtain 1 kg of larger particle part not passing the sieve. These two larger particle parts were mixed and then fed through the upper feed-pipe 4 while the mixture of smaller particle parts passing the sieves was fed through the lower feed-pipe 10 and the collected particles were fed through the lower feed-pipe 3. A gaseous mixture consisting of 80% by volume of chlorine, 15% by volume of oxygen and 5% by volume of nitrogen was fed through the feed-pipes 2 and 10 at a ratio of 3:1. The superficial velocity of the gas flow in the column was 1.6 m/sec near the feed-pipe 3. The reaction was carried out at 1150° C for 90 minutes at an average solid charge density in the reactor of 46 kg/m³. Thus, 12.1 kg of crude titanium tetrachloride was obtained. In the same manner as in Example 1, the conversion of chlorine was found to be 87%.

What is claimed is:

1. A process for producing titanium tetrachloride by chlorinating a titaniferous material which comprises the steps of:
    1. introducing a chlorine-containing gas as an upward flow into a substantially vertical, long column reactor the reaction zone of which widens upwardly, the sectional area of the upper part of the reaction zone being 1.2 to 10 times as large as that of the lower part of the reaction zone,
    2. introducing into the reactor at at least two places including one place at the upper part of the reactor and one place at the lower part of the reactor solid raw material consisting of said titaniferous material in the form of fine particles at least 20% by weight of which passes through a 200 mesh Tyler standard sieve and a solid carbonaceous reducing agent, and
    3. regulating the amount of the reactants charged in (1) and (2) so that the maximum superficial linear velocity of the gas in the reaction zone is 1 to 10 m/sec., the solid charge density in the reaction zone is 10 to 200 Kg/m, and maintaining the reaction zone in a dilute-phase fluidization system accompanied by the reflux of part of the solid raw material particles, and effecting the chlorination at a temperature of 900° to 1400° C.

2. The process as claimed in claim 1, wherein the maximum superficial linear velocity of the gas in the reaction zone is 1.2 to 6.0 m/sec.

3. The process as claimed in claim 1, wherein the solid charge density in the reaction zone is 20 to 150 Kg/m³.

4. The process as claimed in claim 1, wherein the chlorination is carried out at a temperature of 1000° to 1300° C.

5. The process as claimed in claim 1, wherein coarse solid raw materials are charged into the upper part of the reaction zone and finer solid raw materials are charged into the lower part of the reaction zone.

6. The process as claimed in claim 1, wherein said titaniferous material has a TiO₂ content of at least 60% by weight.

7. The process as claimed in claim 1, wherein said titaniferous material is a titanium slag or titanium concentrate having a TiO₂ content of at least 80% by weight.

8. The process as claimed in claim 1, wherein the makeup solid raw materials are charged into the reactor through the upper feed-pipe and the solid raw materials carried over and collected are charged through the lower feed-pipe.

9. The process as claimed in claim 1, wherein the makeup solid raw materials contain 10 to 40% by weight of the solid carbonaceous reducing agent.

* * * * *